(12) United States Patent
Fischer et al.

(10) Patent No.: US 10,578,286 B2
(45) Date of Patent: Mar. 3, 2020

(54) DEVICE FOR THE CONNECTION OF ELECTRICAL LUMINAIRES WITH FAULT CURRENT DIVERSION

(71) Applicant: Filuxx Systems GmbH, Bad Camberg (DE)

(72) Inventors: Hans Richard Fischer, Balve-Eisborn (DE); Stefan Lopaska, Bad Camberg (DE)

(73) Assignee: Filuxx Systems GmbH, Bad Camberg (DE)

( * ) Notice: Subject to any disclaimer, the term of this patent is extended or adjusted under 35 U.S.C. 154(b) by 492 days.

(21) Appl. No.: 15/033,152

(22) PCT Filed: Oct. 23, 2014

(86) PCT No.: PCT/EP2014/072770
§ 371 (c)(1),
(2) Date: Apr. 29, 2016

(87) PCT Pub. No.: WO2015/062972
PCT Pub. Date: May 7, 2015

(65) Prior Publication Data
US 2016/0258605 A1    Sep. 8, 2016

(30) Foreign Application Priority Data

Oct. 31, 2013 (DE) .................. 20 2013 010 245 U
Jul. 22, 2014 (DE) .................. 20 2014 006 057 U

(51) Int. Cl.
*F21V 21/03* (2006.01)
*F21V 23/06* (2006.01)
(Continued)

(52) U.S. Cl.
CPC .............. *F21V 21/03* (2013.01); *F21V 23/06* (2013.01); *H02G 3/12* (2013.01); *H02G 3/20* (2013.01)

(58) Field of Classification Search
CPC ........ F21V 21/03; F21V 23/06; F21V 21/112; H02G 3/20; H02G 3/14; H02G 3/086;
(Continued)

(56) References Cited

U.S. PATENT DOCUMENTS 6,135,814 A     10/2000  Fischer et al.
6,342,676 B1 *  1/2002   Ha ........................... H02G 3/14
                                                        174/67

FOREIGN PATENT DOCUMENTS

DE     27 30 859 A1    1/1979
DE     90 12 349 U1   10/1990
(Continued)

OTHER PUBLICATIONS

English Translation of EP 0473042, Fischer, Mar. 1992.*
(Continued)

*Primary Examiner* — Edwin A. Leon
*Assistant Examiner* — Matthew T Dzierzynski
(74) *Attorney, Agent, or Firm* — Collard & Roe, P.C.

(57) ABSTRACT

A device for the connection of luminaires with fault current diversion includes a support socket and a contact bar which are covered by a support plate, and the contact bar produces a support connection with a pivotal hook. The support plate contains an insert channel into which can be inserted a luminaire plug.

6 Claims, 21 Drawing Sheets

Figure 1:
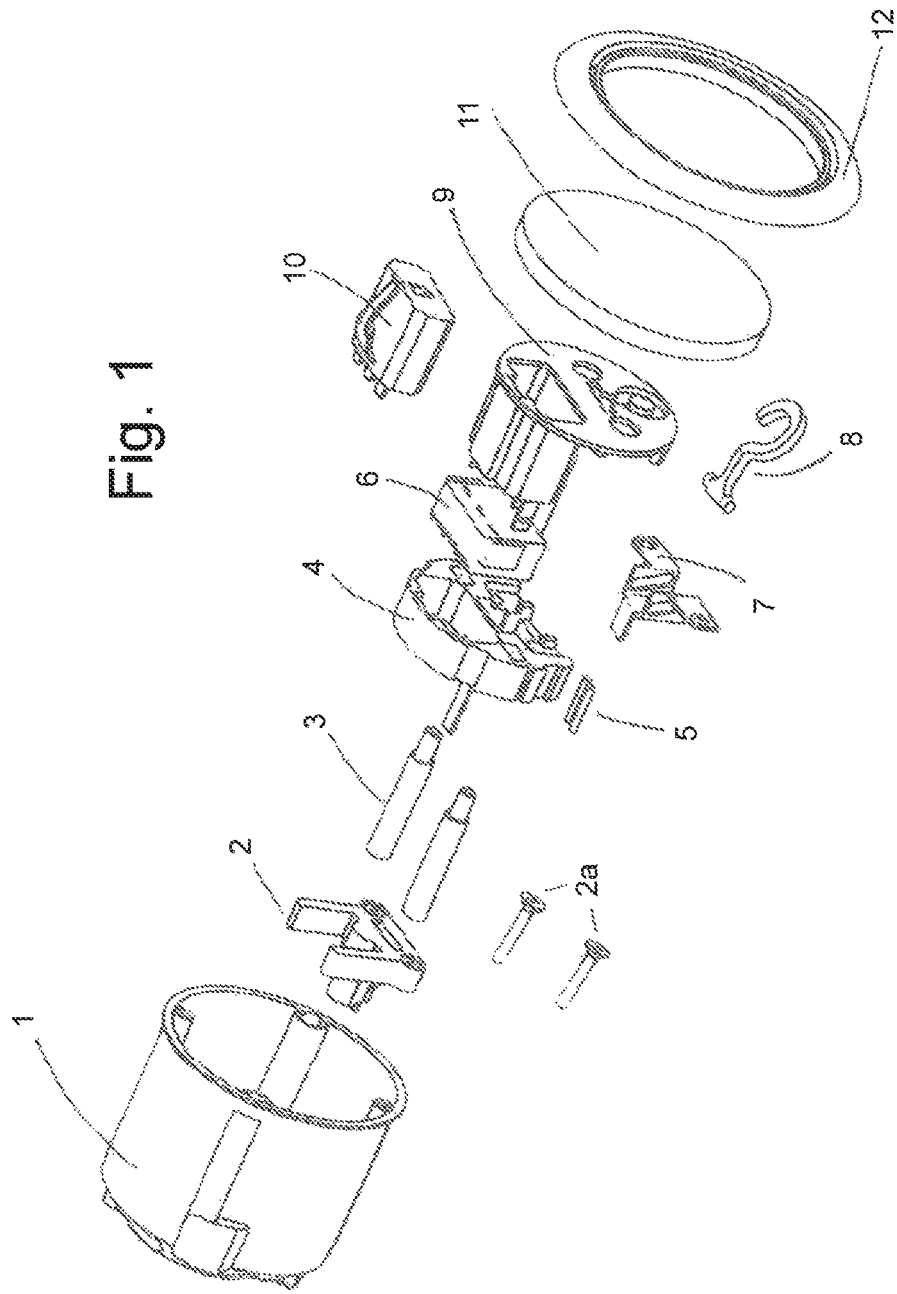

(51) Int. Cl.
  *H02G 3/20* (2006.01)
  *H02G 3/12* (2006.01)

(58) Field of Classification Search
  CPC .. H02G 3/12; H01R 13/6395; H01R 33/0872;
       H01R 13/629; H01R 23/10; H01R 24/76
  USPC ........ 362/406, 429, 430, 439; 439/529, 551,
                                              439/576, 902
  See application file for complete search history.

(56) References Cited

FOREIGN PATENT DOCUMENTS

| | | | |
|---|---|---|---|
| DE | 197 00 730 A1 | 7/1998 | |
| DE | 20 2005 004 333 U1 | 5/2005 | |
| EP | 0473042 A2 * | 3/1992 | .............. F21V 21/03 |
| EP | 1109270 A2 * | 6/2001 | .............. F21V 21/03 |
| FR | 2 821 149 A1 | 8/2002 | |
| FR | 2 953 905 A1 | 6/2011 | |
| WO | 98/30836 A1 | 7/1998 | |
| WO | WO 2010063042 A1 * | 6/2010 | .............. F21V 21/03 |

OTHER PUBLICATIONS

English Translation of FR 2953905, Jadaud, Jun. 2011.*
International Search Report of PCT/EP2014/072770, dated Feb. 5, 2015.
DIN EN 61995-1 (VDE 0620-400-1), Devices for the connection of luminaires for household and similar purposes—Part 1: General requirements, Mar. 2009, 73 pages.
IEC 61995-2, International Standard, Devices for the connection of luminaires for household and similar purposes—Part 2: Standard sheets for DCL, 2009, 25 pages.

* cited by examiner

DEVICE FOR THE CONNECTION OF ELECTRICAL LUMINAIRES WITH FAULT CURRENT DIVERSION

CROSS REFERENCE TO RELATED APPLICATIONS

This application is the National Stage of PCT/EP2014/072770 filed on Oct. 23, 2014, which claims priority under 35 U.S.C. § 119 of German Application Nos. 20 2013 010 245.4 filed on Oct. 31, 2013 and 20 2014 006 057.6 filed on Jul. 22, 2014, the disclosures of which are incorporated by reference. The international application under PCT article 21(2) was not published in English.

The invention relates to an apparatus for connection of electric light fixtures having fault-current discharge, in accordance with claim 1.

Apparatuses for connection of electric light fixtures are known in many different ways (see, for example, DE 20 2005 004 333 U1). In such apparatuses for connection of ceiling light fixtures, it is required, among other things, that not only an electrical connection but also a mechanical connection is provided. It is furthermore prescribed that touchable metal parts of the power outlet, which can be under voltage in the event of an insulation defect, must be permanently and reliably connected with the protective-conductor connecting terminal of the power outlet.

For this case of use, for example, a ceiling power outlet for ceiling light fixtures is known from WO 98/30836 A1, in which the aforementioned requirements are met in that the suspension apparatus is provided with a hook that can be folded down, which hook is screwed into the protective conductor of the suspension apparatus. As a consequence, the required fault-current discharge is present in this regard.

However, standards in their most recent version require the use of plug-in elements when connecting electric light fixtures, which elements can be connected with a standardized plug according to DIN-EN 61995-2. In this regard, too, however, it is necessary that fault currents are conducted away by way of the protective conductor, in order to reduce the safety risk when connecting the light fixture. In the known solutions, this requirement is not satisfied, because when connecting chandeliers having metal chains or other fixture parts made of metal, which can be touched, for example, transfer of the current to the metal parts present, for example to the chains, can take place in the event of unrecognized damage to the power cable. The fault currents brought about in this way can only be detected when/after the light fixture is turned on. The safety risk of the known apparatuses is therefore significant.

In the case of light fixture connectors that are known and available in commerce, there are no solutions that meet the requirements of DIN-EN 61 995 Part 1 No. 11-Protective-conductor connector 11.3, even in the case of those that make reference to the standards. Instead, these light-fixture connectors, comparable to the previous state of the art with chandelier terminal and hook, also merely contain an electrical plug-in connection and, separate from that, a hook. The actual attempt of the standards that have entered into force, that of making it safer for non-experts to connect light fixtures, is not fulfilled by these products that are offered.

This is where the invention wishes to provide a remedy. The invention is based on the task of creating an apparatus for connection of electric light fixtures, which apparatus fulfills the requirements of the standard. According to the invention, this task is accomplished in that a plug-in body for accommodating a plug can be plugged in according to DIN-EN 61 995-2, which body is connected with the mechanical suspension apparatus by way of the protective-conductor contact.

With the invention, an apparatus for connection of electric light fixtures is created, which meets the standards. It is therefore suitable for discharging fault currents and thereby for fulfilling the requirements regarding safety and accident prevention. This is brought about in that each operating means (mounting box) suitable for installation is provided with a socket adapter that is attached centrally to the bottom of the mounting boxes, with screws. Known, commercially available mounting boxes are provided either with a screw nut that is cast in, or with a steel bracket on the outside, which has a screw thread in the center.

The connection, on the one side with the electrical building installation, on the other hand with the plug-in connection required in the DIN standard, with the components disposed within it, takes place outside of the mounting box. Only after this connection has taken place are the components that are joined together to form the apparatus according to the invention and have been pre-installed inserted into the mounting box and connected with the socket adapter by way of the connection mandrels, with screws. At the seine time, the apparatus is suitable for allowing the planned plug-in connection, using the standardized plugs. Facilitation of installation takes place in this connection method, particularly for the event that connectors having wire cross-sections of 2.5 mm² are required, because these are particularly difficult to handle because of the particular thickness of the cable, and therefore can very easily come loose from the connections.

When using different mounting boxes, which are commercially available, having different mounting depths, the mechanical pre-installation takes place in such a manner that connection mandrels that belong to the components of the apparatus, having adapted lengths, produce the connection between socket adapter and the other components, so that the same end position, level with the edge of the mounting box, is always ensured.

Installation of the components to produce a plug-in system that meets the standard takes place on the basis that both the mechanical and the electrical connector are present in the apparatus, each performing its own function, but an integrated connection is produced between them, for discharge of possible fault currents. The standard prescribes this—this solution is created with the invention.

A central component of the apparatus is a support socket with which all the other components are connected. The metallic support insert for accommodation of the hook that can be folded down and the contact rail that is angled away lies on the support socket. Holes for the screws are introduced into the support insert for attachment of the entire apparatus. A support plate having a plug insertion channel is situated lying on the support socket. Support plate and plug insertion channel form a unit. Plug-in guides for introduction and placement of the connection mandrels, by means of which the entire system is connected with the socket adapter, are situated on the underside of the support socket, on the screw perforation. The connection between support socket and support plate takes place by way of guide crosspieces that lie opposite guide grooves and engagement crosspieces that lie opposite engagement grooves.

The plug insertion channel is open at both ends. At the upper end, the plug insertion channel is firmly connected with the support plate, and at the lower end, it is provided with connection journals to accommodate the plug-in body for the electrical connection.

In a further development of the invention, the protective contact of the plug-in body, connected at the center and on the bottom, is provided with a metal tab that projects out of the plug-in body, angled away at 90 degrees and lying against the plug insertion channel on the outside, so that this tab faces directly toward the contact rail of the support insert, as soon as the plug-in body is connected with the plug insertion channel.

After the metal tab of the plug-in body has been connected with the contact tall of the support insert by means of a connection shoe, the connection between the mechanical region and the protective-conductor region has been produced. Any fault currents that occur, from the light fixture by way of the hook, the support insert, the contact rail, the connection shoe, and by way of the metal tab to the protective conductor of the plug-in body, can be discharged at any time, preventing danger and in accordance with the requirements of DIN-EN 61 995-1.

Shielding of the parts that conduct current (metal parts) takes place by means of wall surfaces and plastic crosspieces that prevent touching the metal parts from the outside, in that they form a guide channel. These are situated on the underside of the support socket, the outside of the plug insertion channel, and on the plug-in body, on both sides of the metal tab.

In a further development of the invention, the apparatus for connection of electric ceiling light fixtures is provided with a cover ring that is kept flat, and is provided with engagement crosspieces that are locked into the cover plate by means of engagement grooves. When a ceiling connector for light fixtures is not in use, a cover plate can be inserted into the cover ring, so that in comparison, with previous lighting outlets (light fixture connection points) having a chandelier terminal and a hook, an esthetic look is achieved.

In a further development of the invention, the apparatus for connection of electrical wall light fixtures according to DIN-EN 61 995-1 and 2 is provided. This takes place in such a manner that installation cables in commercially available mounting boxes project out of the wall. These mounting boxes are provided with an end cover, which is screwed into the screw columns of the mounting box. In comparison with ceiling mounting boxes, the screw columns, which are affixed on the side, are shortened by approximately 2 mm, which brings about the result that the end cover is inserted "into" the mounting box and therefore a flush wall finish is always achieved. In the center, the end cover has an opening with a plug insertion channel injection-molded on and an engagement mechanism. The insertion channel is open, on both sides and is provided, on the opposite side from the end cover, with connection journals for accommodation of the plug-in body for the electrical connection. As a counter-part to the engagement mechanism with the plug-in body, engagement insertion openings are affixed here. Here, too, the mounting box is installed into the wall. The electrical cable connection takes place outside of the mounting box. This—end cover, plug insertion channel, and plug-in body with cables—is then screwed onto the mounting box, flush with the wall, as an end cover, by means of box screws. The metal tab and the plastic crosspieces as contact protection are pushed into a shielding shaft during engagement.

Figure 2:
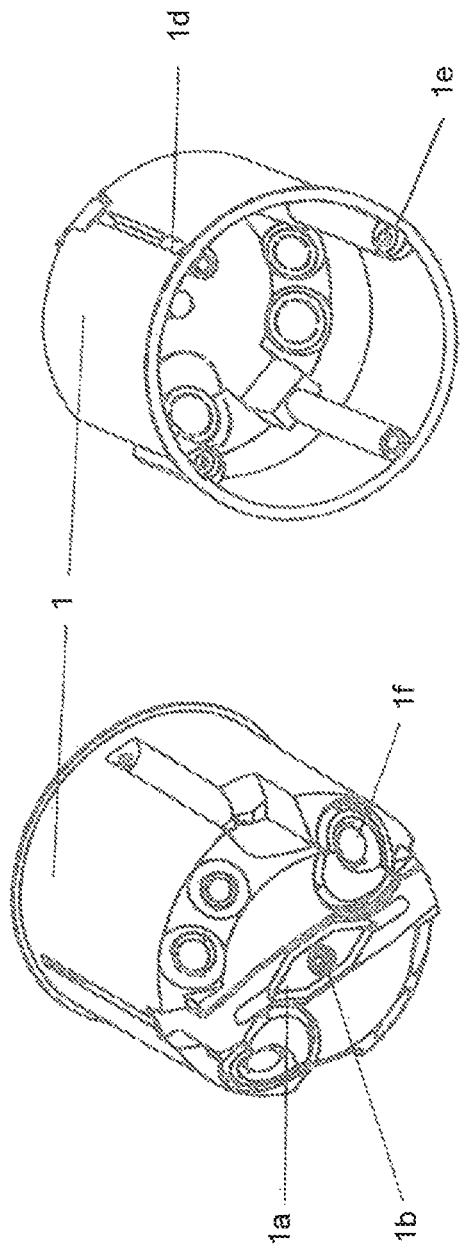
Figure 3:
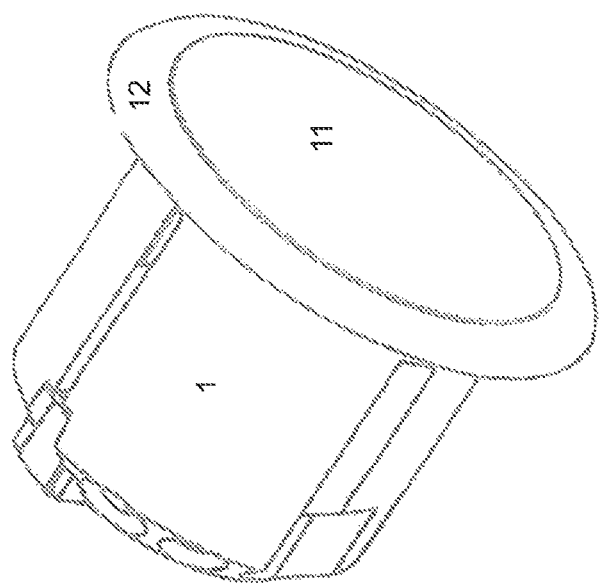
Figure 4:
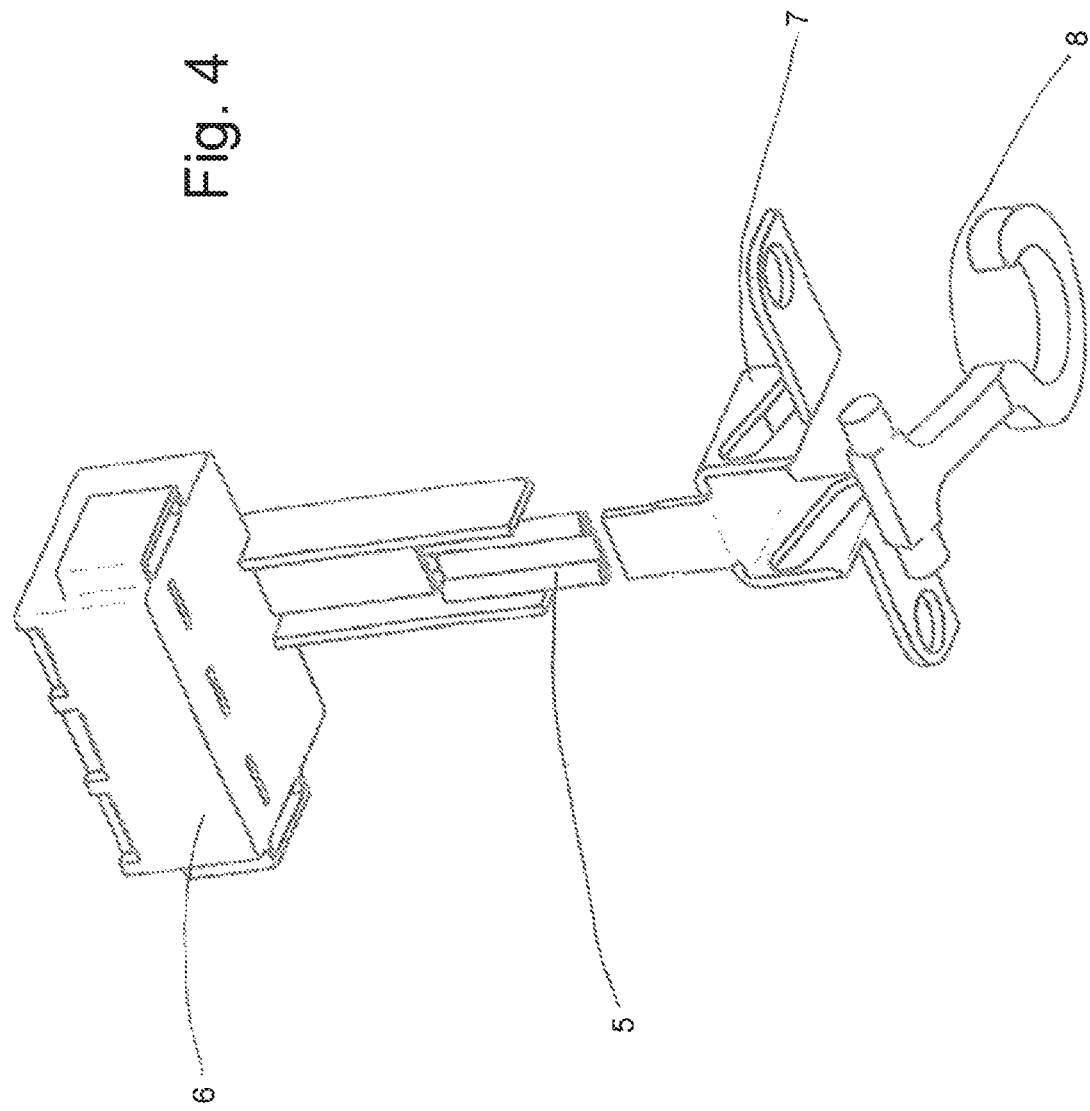
Figure 5:
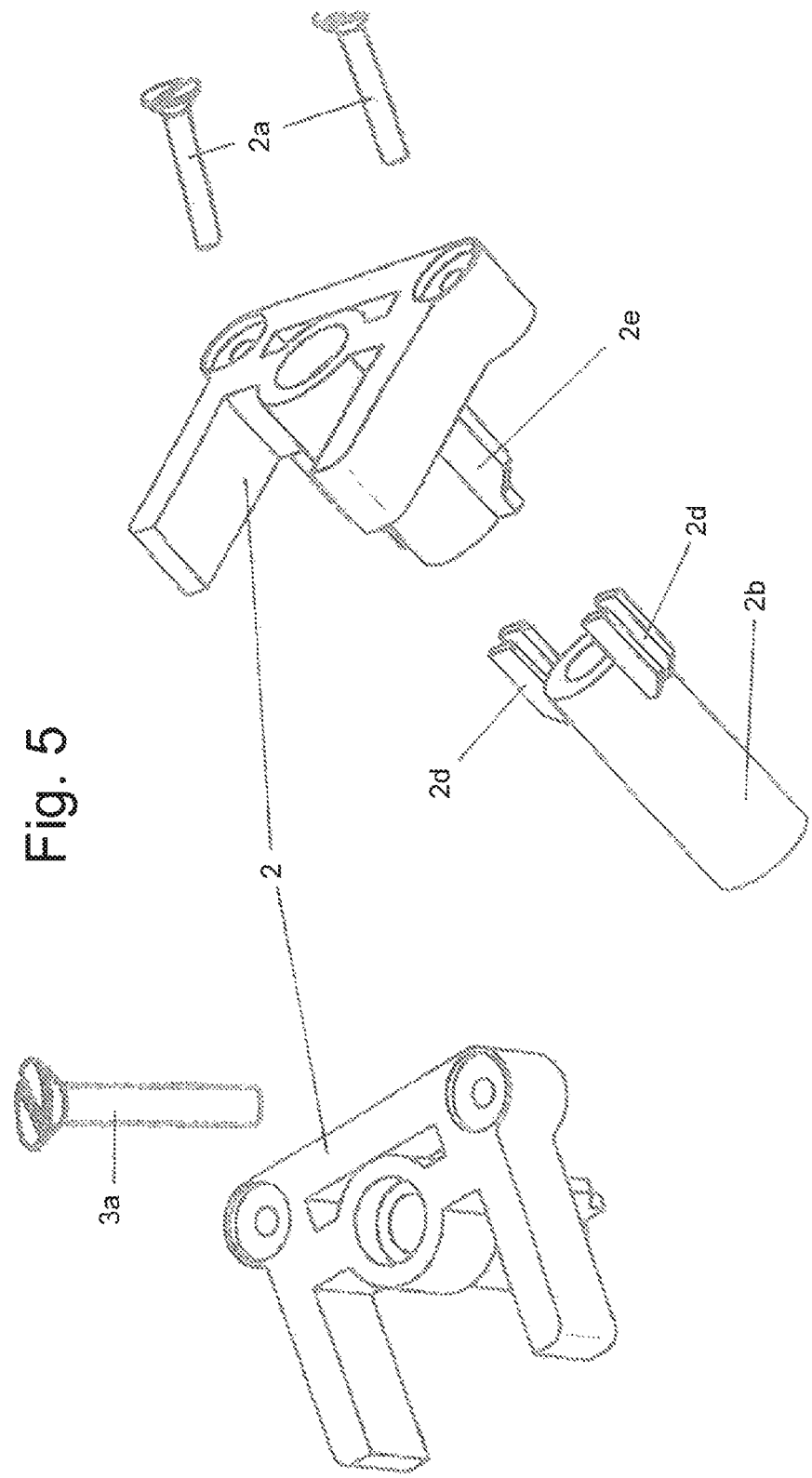
Figure 6:
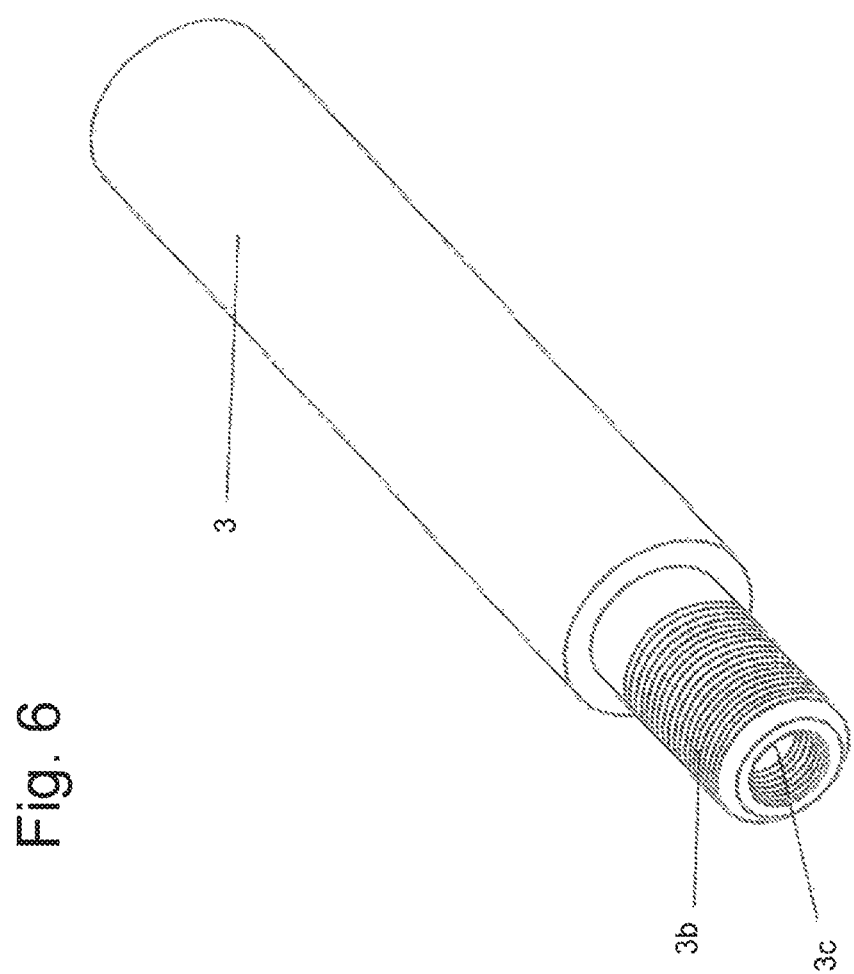
Figure 7:
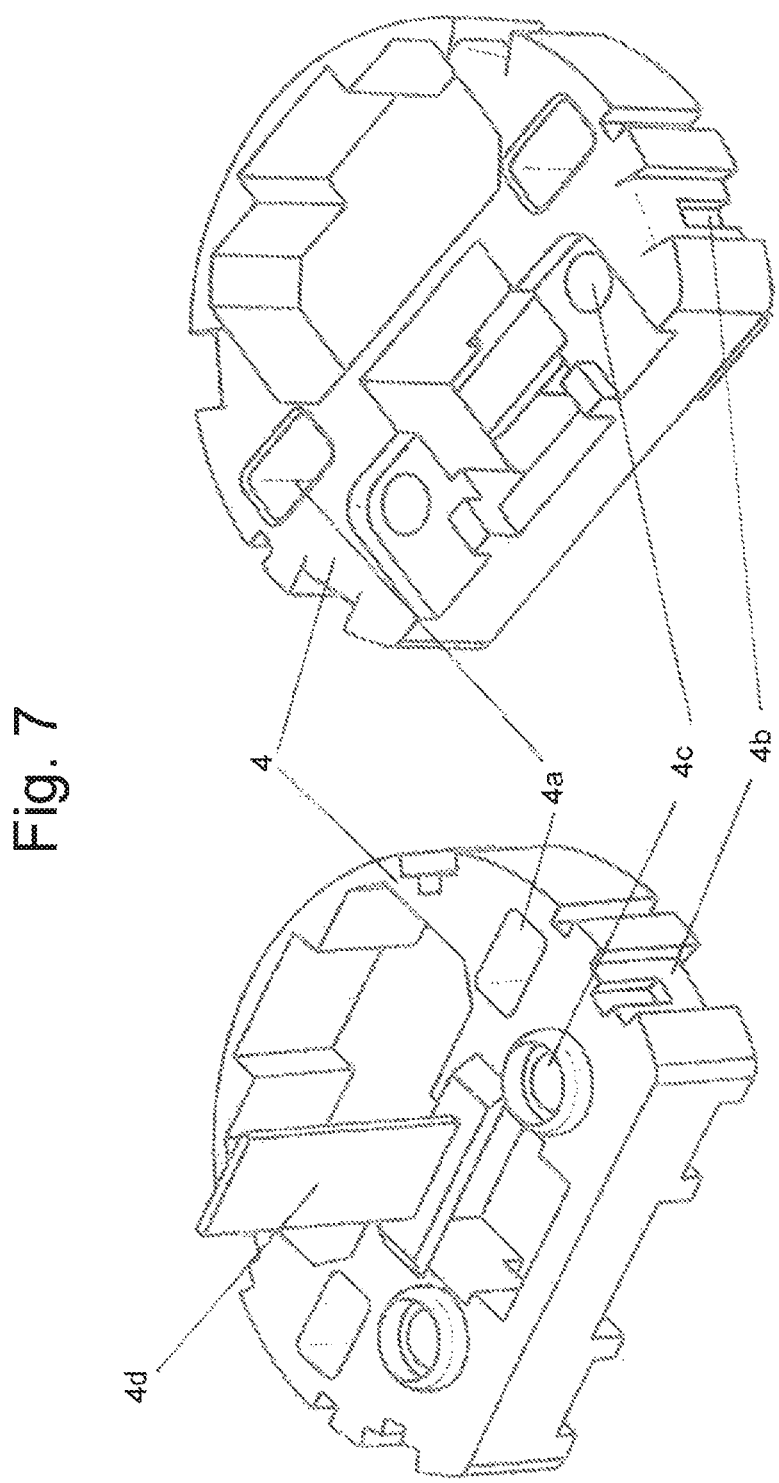
Figure 8:
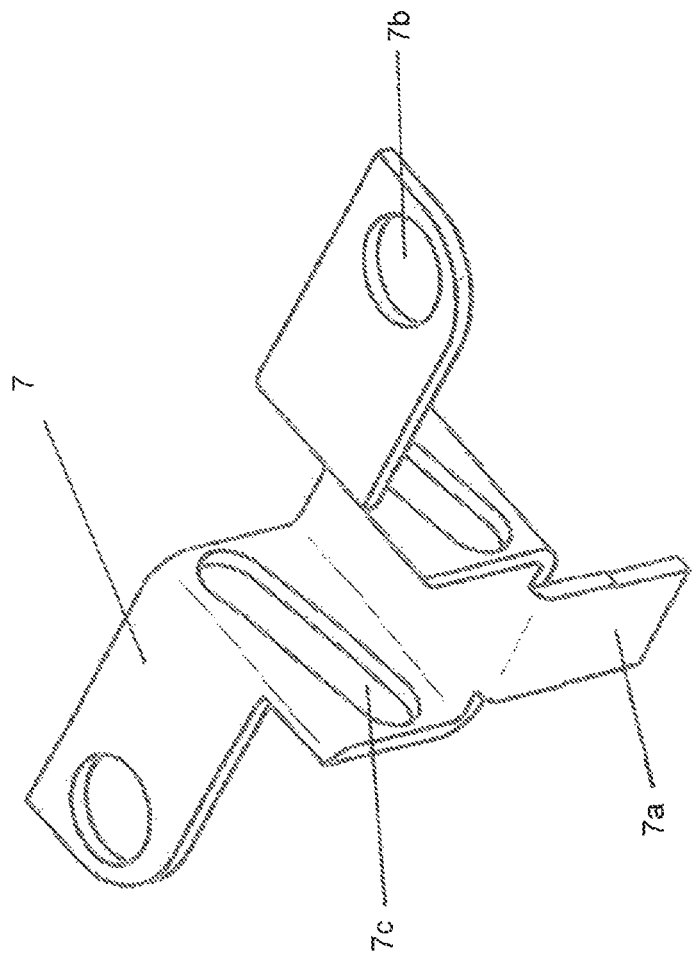
Figure 9:
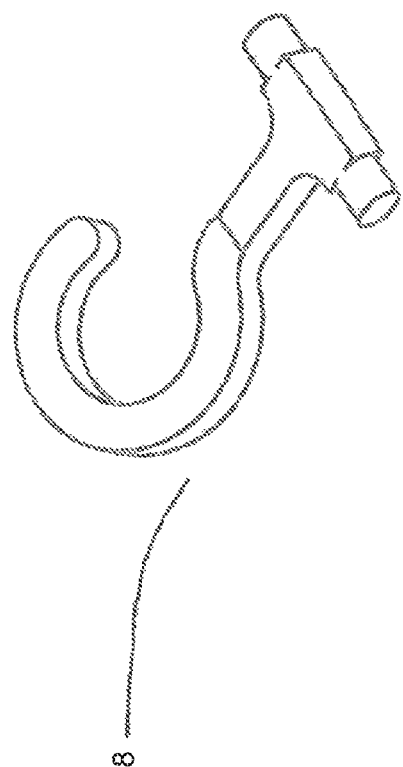
Figure 10:
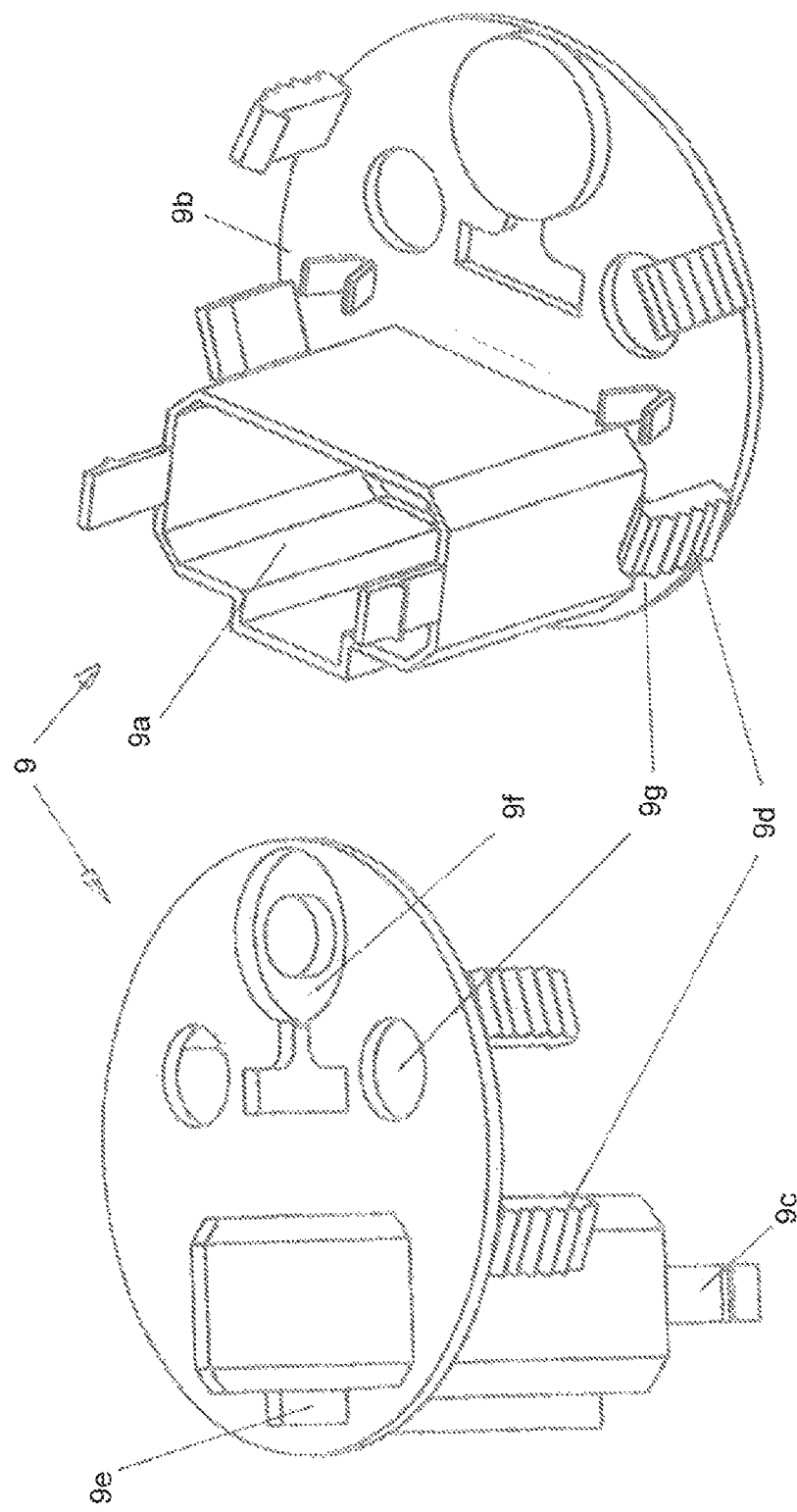
Figure 11:
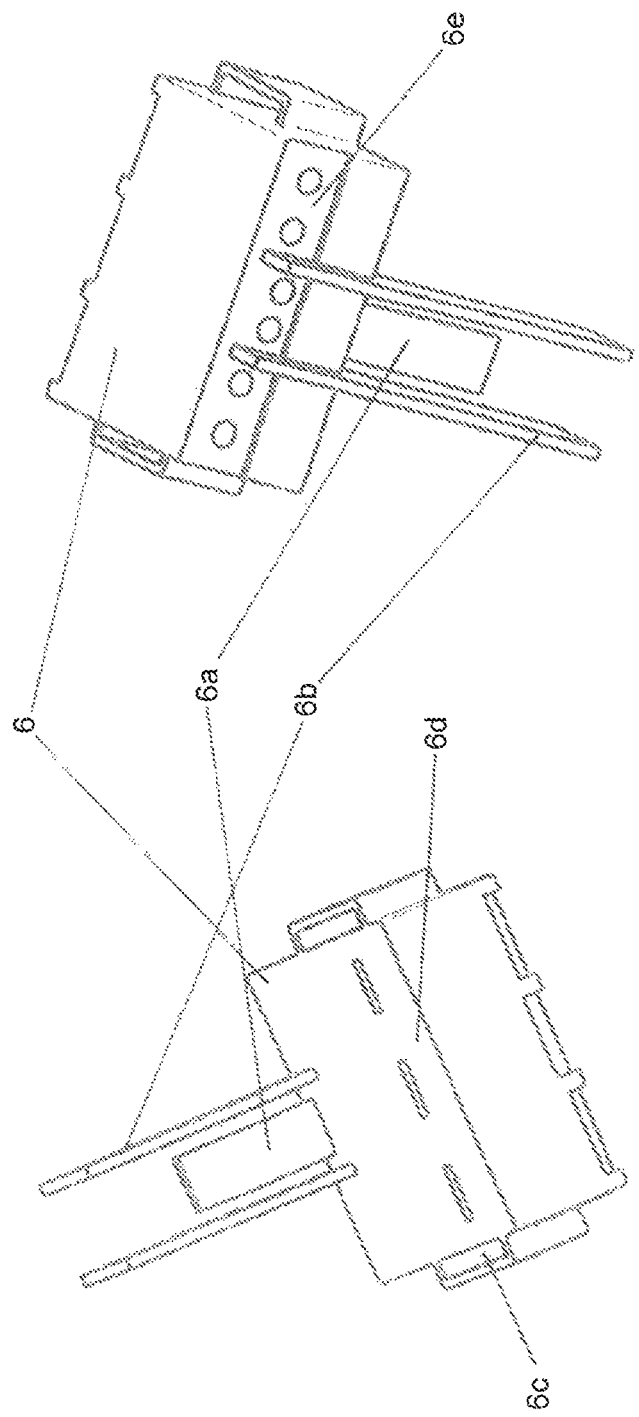
Figure 12:
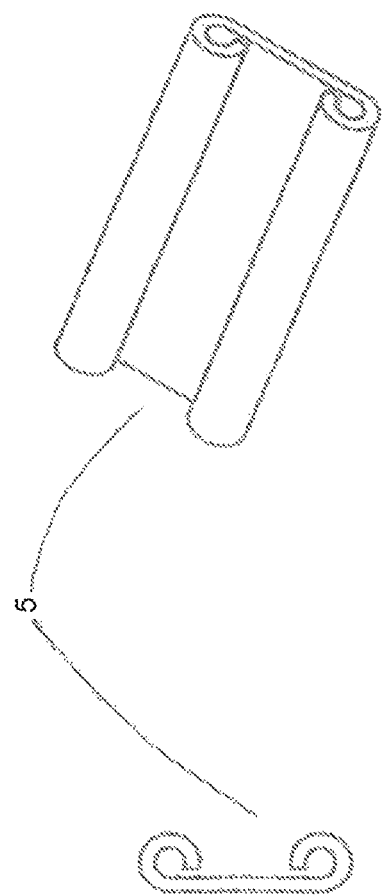
Figure 13:
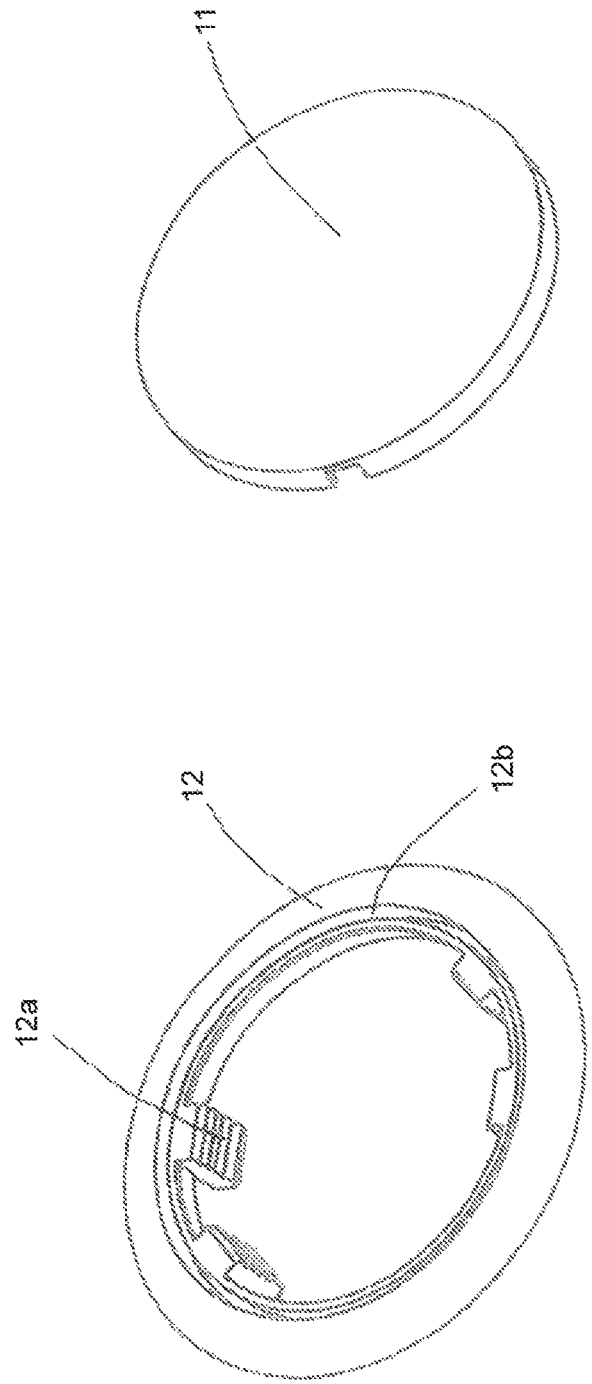
Figure 14:
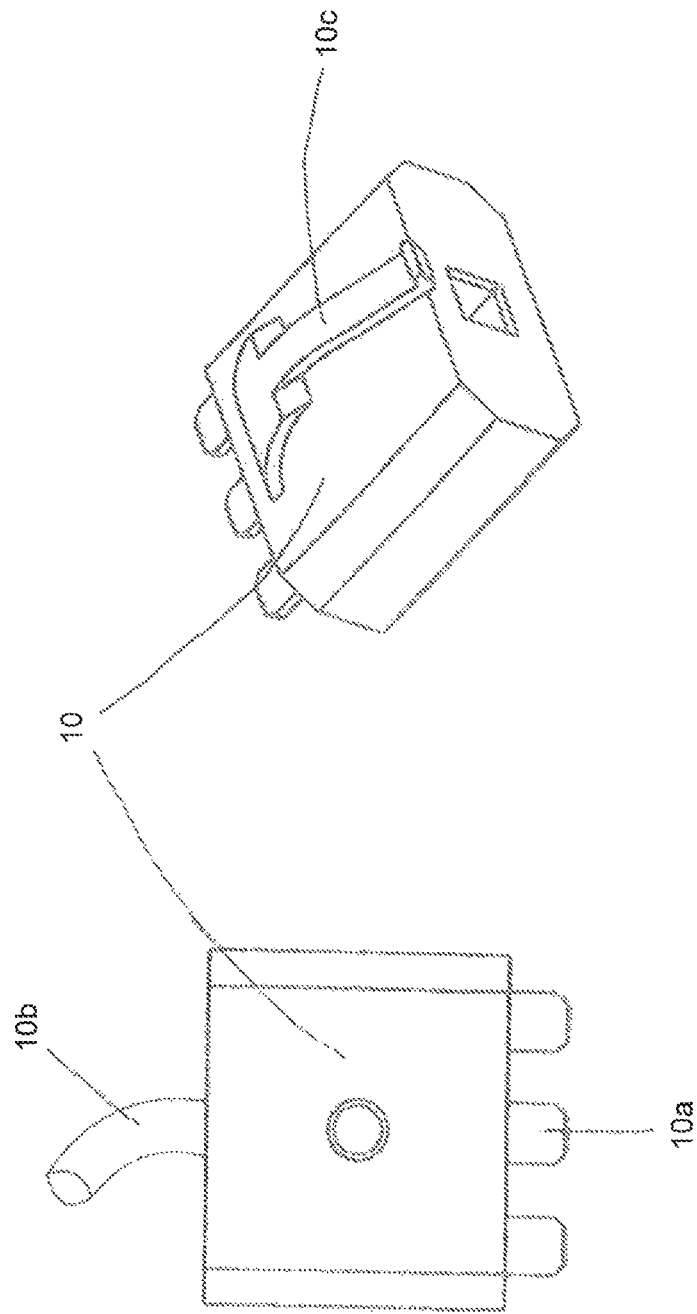
Figure 15:
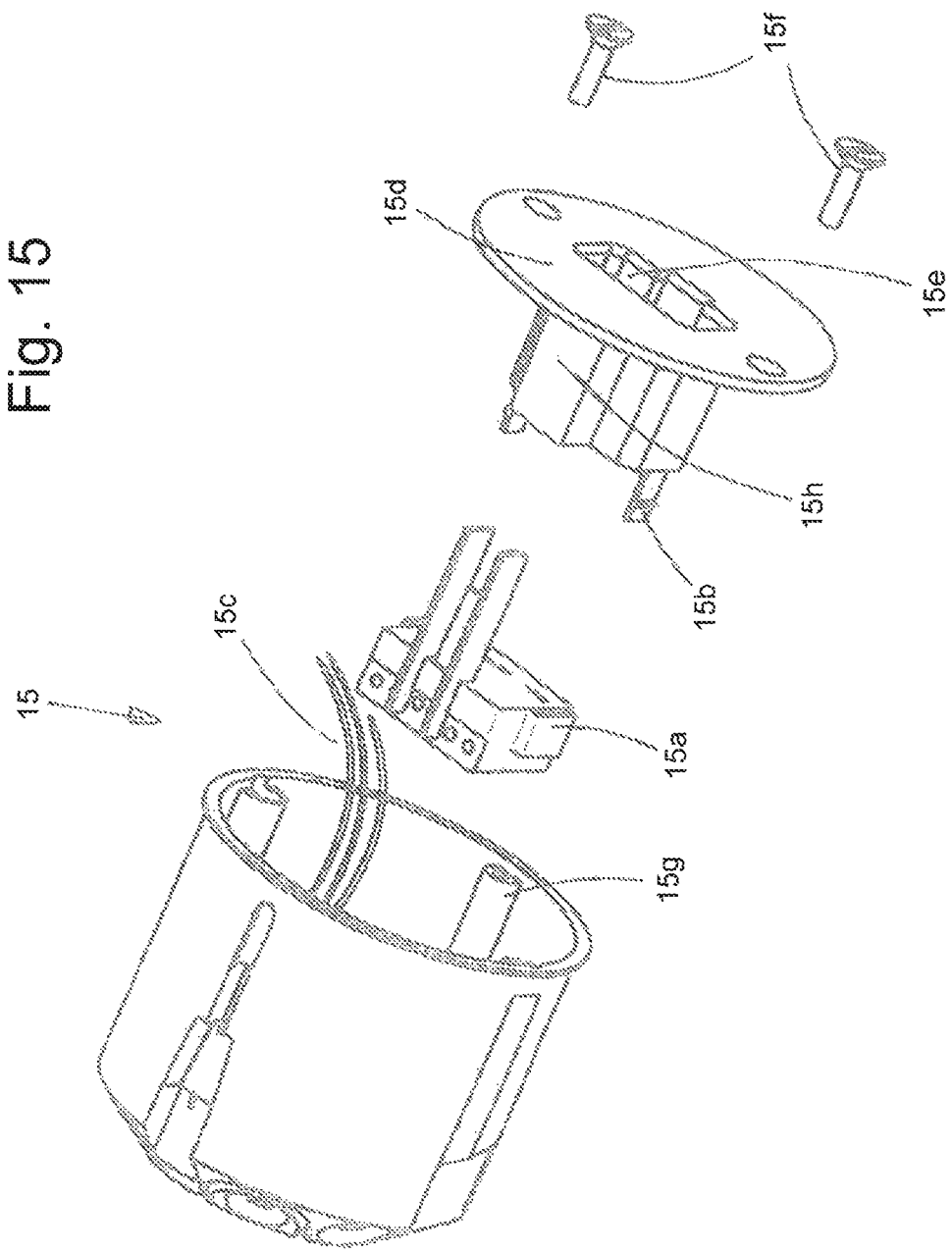
Figure 16:
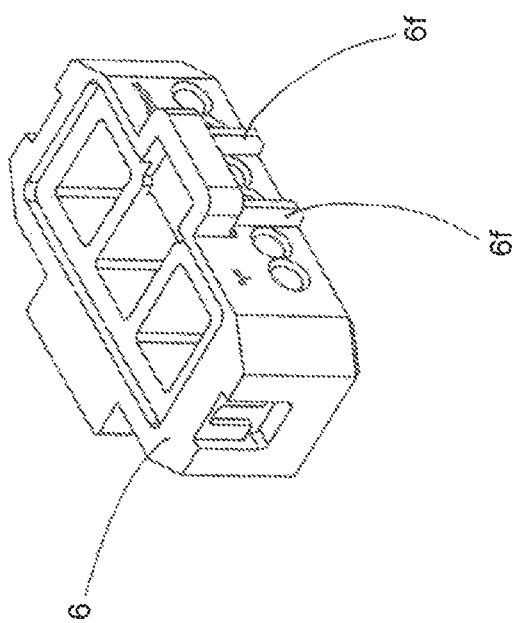
Figure 17:
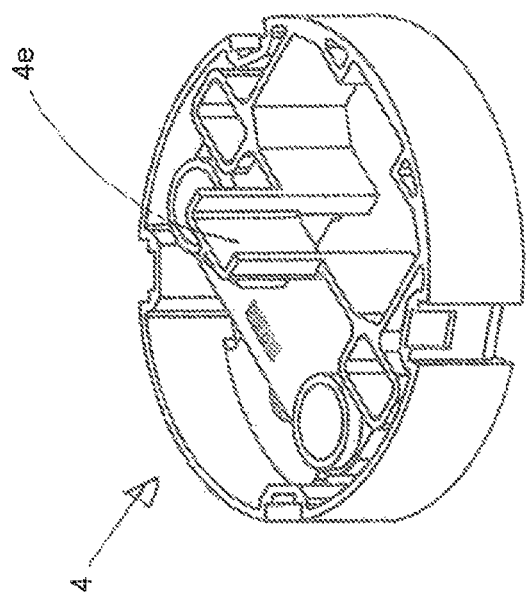
Figure 18:
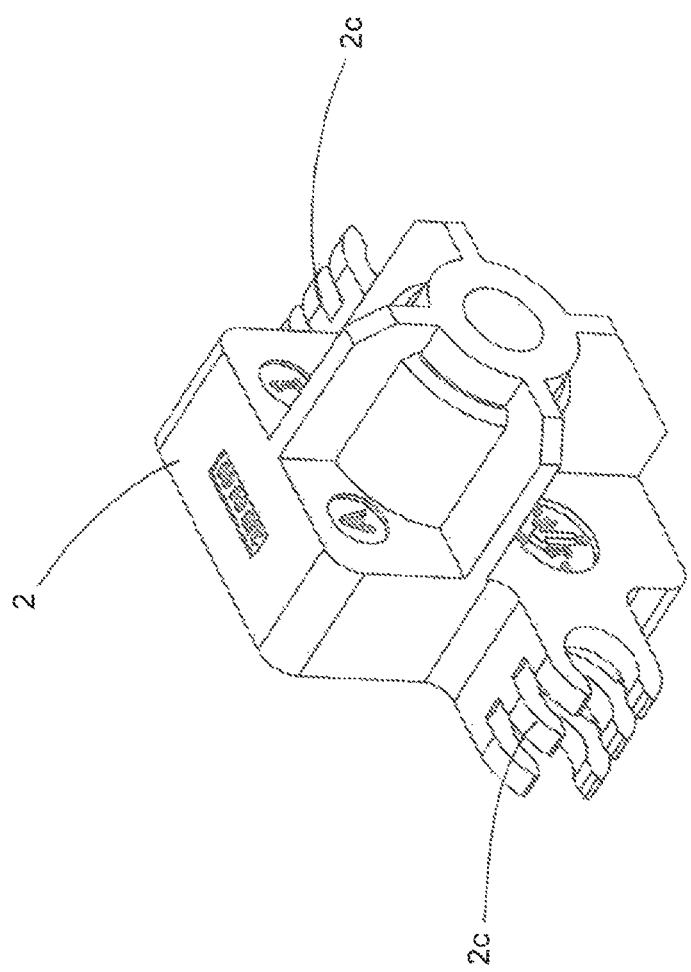
Figure 19:
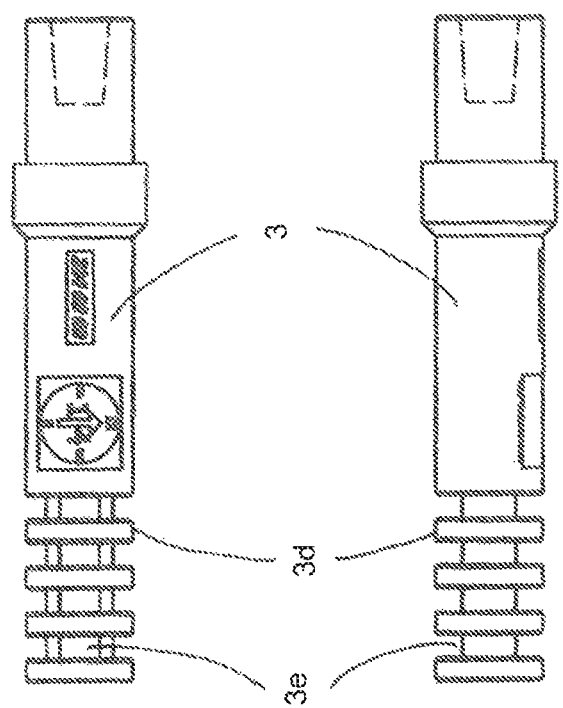
Figure 20:
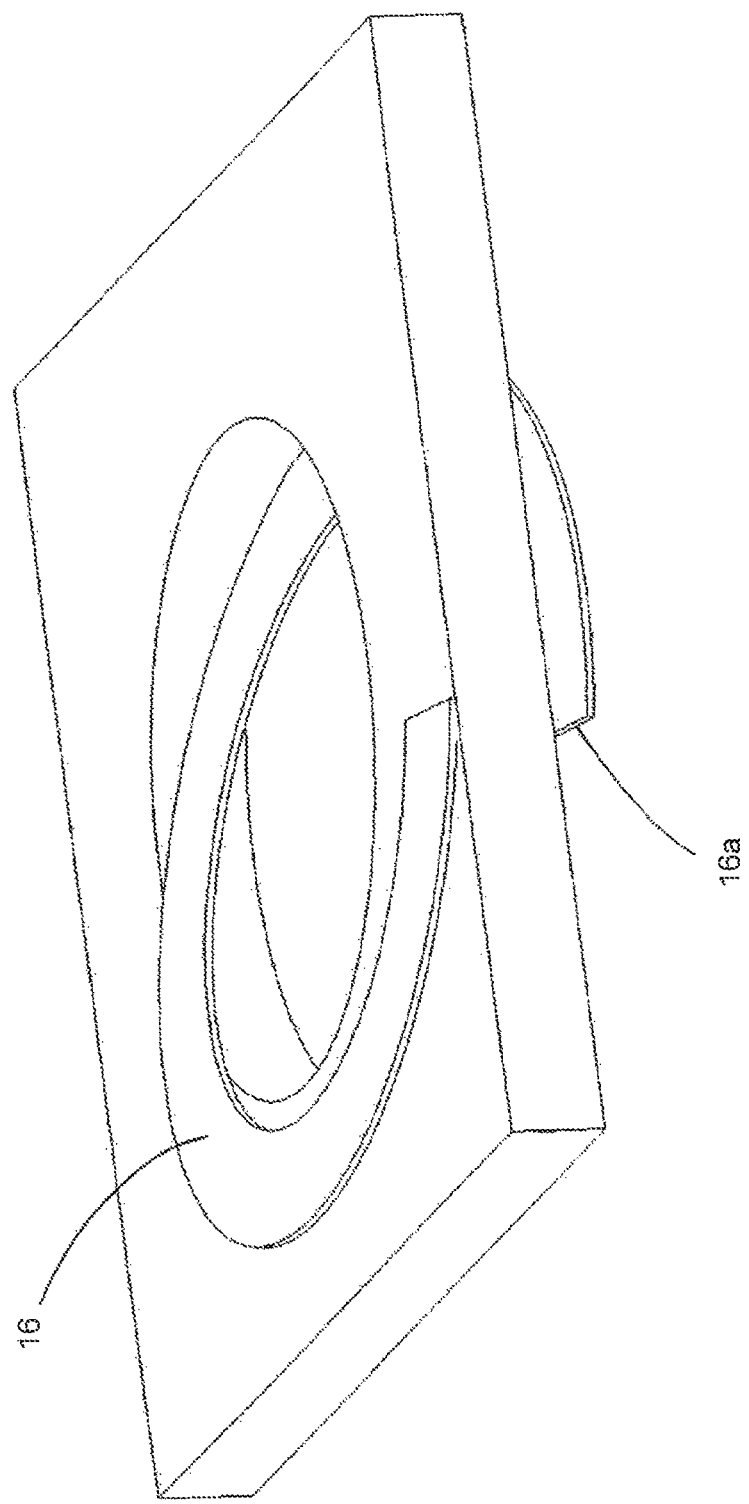

Exemplary embodiments of the invention are shown in the following drawings. These show:

FIG. 1 the exploded representation of the apparatus according to the invention;

FIG. 2 the perspective representation of a mounting box;

FIG. 3 the outside view of a finished, installed connection system according to FIG. 1;

FIG. 4 the representation of the parts that form the fault-current discharge;

FIG. 5 a socket adapter with spacer;

FIG. 6 the representation of a connection mandrel;

FIG. 7 a support socket having the functional holes according to FIG. 1;

FIG. 8 a support insert with screw holes for system attachment and contact rail;

FIG. 9 the representation of an insertion hook that can be folded down;

FIG. 10 a support plate having a plug insertion channel;

FIG. 11 a plug body for the electrical connection with metal tab/contact spring and plastic crosspieces as contact protection;

FIG. 12 a connection shoe for connection of contact rail and metal tab;

FIG. 13 a cover ring and a cover plate according to FIG. 1;

FIG. 14 a light fixture plug according to DIN-EN 995-1 with cable access;

FIG. 15 the exploded representation of an apparatus for connection of electric wall light fixtures with mounting box, wall box lid with plug insertion channel and box screws according to FIG. 13;

FIG. 16 the corpus of a plug-in body in a different embodiment;

FIG. 17 a support socket in a different embodiment;

FIG. 18 a socket adapter-in a different embodiment;

FIG. 19 a connection mandrel in a different embodiment;

FIG. 20 a reinforcement ring during installation; and

Figure 21:
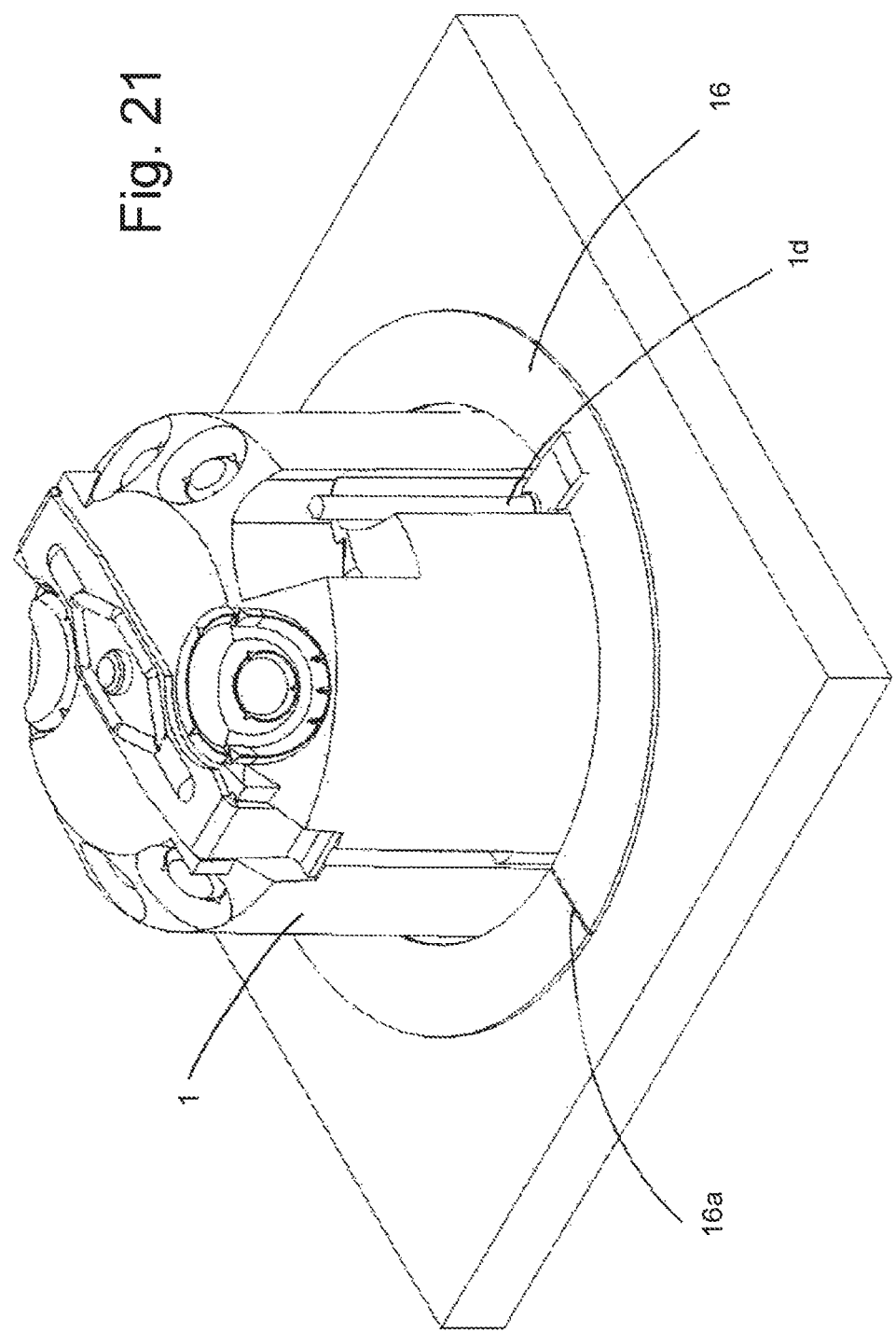

FIG. 21 a mounting box in the installed position, with reinforcement ring.

The figures show, in an exploded arrangement, all the system parts of an apparatus for light fixture connectors below living space ceilings, in a cavity box (1), which accommodates the other installation parts of the system in the installed state. These include the individual parts of an apparatus, represented in FIGS. 2 to 19, that meets the requirements of the standards DIN-EN 61995 Part 1 and 2, for both electrical and mechanical connections, in the case of light fixture connection systems.

The cavity box (1) is configured in known manner and consists of plastic, as an insulation delimitation relative to the wall or building ceiling. Closed perforation locations (1*f*) with openings to be broken out are affixed laterally on the bottom of the box, through which openings the cables of the building installation can be passed, if necessary. In the known mounting boxes (cavity boxes or concrete installation boxes) available commercially, either screw nuts are cast in, in the center, or the boxes are provided with an attachment bracket (1*a*) from the outside, with a centrally affixed screw thread (1*b*), so that here, the system-related socket adapter (2) of the system is laid in centrally, in the interior of the mounting box, and attached with a screw (3*a*).

The representation in FIG. 2 snows a mounting box (1) having a steel bracket (1*a*) having a screw thread breakout (1*b*)—for example in the case of hollow ceiling boxes, which are known to be provided with spreader brackets (1*a*) and with box screws that attach the spreader brackets behind the ceiling. The screw columns (1*e*) are situated in the interior of the mounting box. The end of the box is reinforced and acts as a lower counter-pressure point to the spreader brackets (1*d*) in the attachment. In the case of concrete mounting boxes, this procedure is eliminated, since these boxes find their hold in the concrete ceiling into which they were cast.

In FIG. 4, it is shown how the discharge of possible fault currents, which occur in ceiling light fixtures having metal transitions and have an unrecognized defect, takes place. Fault current discharge can only take place if a connection that discharges fault currents or activates the FI switch of the building installation and interrupts the power supply in controlled manner is produced between the mechanical suspension apparatus (hook) (8) of the light fixture connector and the protective-conductor function of the connection system.

In the representation according to FIG. 4, the light fixture is suspended on the hook (8). This hook is folded out only when in use and lies in the oblong holes (7c) of the support insert (7). The connection to the metal, tab (6a) of the contact block (6), by way of the connection shoe (5), is produced by way of the contact rail (7a); the tab is directly connected with the protective conductor of the building installation. In this manner, a maximum of safety is produced, and fault current effects on the user are prevented.

The socket adapter (2) shown in FIG. 5 offers a guarantee for installation in all commercially available mounting boxes. It is known that all mounting boxes according to FIG. 2 are provided with a centrally cast in screw nut or a steel bracket having a screw thread. However, the box depths vary, and the different box depths can be equalized by means of a spacer for the box adapter (2b), so that a uniform installation depth occurs at all times. The box adapter (2b) is provided with guides (2d) that correspond to crosspieces (2e) on the socket adapter (2). Furthermore, the socket adapter ensures that the electrical installation of the system can take place before the actual installation in the mounting box, and that the cable ends (15c) used find room in the rear region of the mounting box and are not squeezed or damaged during insertion of the overall system and attachment to the socket adapter (2). Connection of the socket adapter with the mounting box bottom takes place by means of a screw (3a).

An alternative embodiment of the socket adapter (2) is shown in FIG. 18. In this embodiment, it can be seen that accommodations (2c) are provided on the outside, which are configured to be open at their free ends. Furthermore, the accommodations (2c) are provided with slots.

FIG. 6 shows connection mandrels (3), which not only produce the connection between the socket adapter (2) and the support socket (4) but also equalize different distances between the socket adapter (2) and the support socket (4). Attachment of the individual system parts can take place not only by means of cut-in screw threads (3b) but also by means of pressed-in threaded sleeves (3c). The different lengths of the connection mandrels (3) are coordinated with the commercially available mounting boxes, in each instance.

An alternative embodiment of the connection mandrels (3) is shown in FIG. 19. In this embodiment, the connection mandrels (3) have engagements (3d) at their one end, with which adaptation to different heights of mounting boxes (1) can take place. This is done by means of the correspondence of the engagements (3d) with the slots in the accommodations (2c) of the socket adapter (2). The construction height of the apparatus according to the invention is adjustable as a function of the selected insertion depth of the connection mandrels (3). The connection mandrels (3) have insertion narrowings (3e) between the engagements (3d). The insertion narrowings (3e) allow introduction of the connection mandrels (3) through the open ends in the accommodations (2c). After they have passed the open ends, the connection mandrels (3) are rotated by 90°, so that they are secured to prevent them from independently slipping out of the accommodations (2c).

FIG. 7 shows the support socket (4) as a central component of the system, having the functions according to FIG. 1. All the functional parts of the system are connected with the support socket (4), in other words not only the mechanical suspension, the electrical connection elements, but also the fault-current discharge according to FIG. 4.

As a mechanical support element, the metallic support insert (7) lies on the support socket (4), to accommodate the hook (8) that can be folded down and the angled-away contact rail (7a). For attachment of the entire apparatus, holes (4c) for the screws (2a) are made in the support socket (4). A support plate (9) having a plug insertion channel (9a) is situated to lie on the support socket (4). Support plate (9) and plug insertion channel (9b) form a unit. Plug-in guides for introduction and placement of the connection mandrels (3), by means of which the entire system is connected with the socket adapter (2), are situated on the underside of the support socket (4), on the screw breakout (4c). The connection between support socket (4) and support plate (9) takes place by way of guide crosspieces (9d) that lie opposite guide grooves (4b), and engagement crosspieces (9b) that lie opposite engagement grooves (4a). Furthermore, a plastic crosspiece (4d) is affixed on the underside of the support socket, as contact protection, which crosspiece forms the contact protection in the form of a passage channel for the fault-current discharge, supplemental to the rear side of the plug insertion channel (9a) and the plastic crosspieces (6b) of the plug-in body (6).

An alternative embodiment of the support socket (1) is shown in FIG. 17. In this embodiment, a channel (4e) is disposed on the support socket (4), which channel takes on the function of the plastic crosspieces (6b) in FIG. 11. Advantages in terms of production technology result from this embodiment, resulting in greater precision of the component dimensions, on the one hand, and greater stability, on the other hand.

FIG. 8 snows the support insert (1) with screw holes (7b) for system attachment, and the contact rail (7a) as a connection for the metal tab (6a) of the plug-in body (6). The entire system is connected with the socket adapter (2) by way of the connection mandrels (3), by way of the screw holes of the support insert (7), and attached using screws (2a).

FIG. 9 shows the hook (8) that can be folded down. In the unused state, the hook is folded in and pushed in, as has already been disclosed in WO 98/30836 A1. In this state, the hook (8) lies in a clamping channel (9f) for the hook in the support plate (9).

FIG. 10 snows the support plate (9) with plug insertion channel (9a) with engagement journals (9c) and further functional access parts such as guide crosspieces (9b), engagement crosspieces (9d), screw holes (9g), as well as breakout and clamping channel of the hook (9f). The support plate (9) is attached to the support piece (4), in its guide grooves (4a), using the guide crosspieces (9b), thereby producing the firm connection.

The electrical connection of the building installation with the light fixture is produced by way of the plug-in body (6) as shown in FIG. 11. This takes place by way of the apparatus according to the invention, for connection of wall and ceiling light fixtures, and corresponds to DIN-EN 61 995-2. Using the plug-in body, the possibility exists of plugging in the plug (10) prescribed according to DIN-EN 61 995 and thereby producing the electrical connection between building installation and living space light fixture. Aside from the purely electrical connection, the plug-in body (6) according to the invention is supplemented with a metal tab (6a), in such a manner that the requirements of DIN-EN 61 995-2 are also met, in that touchable metal parts of a light fixture, which can stand under voltage in the case of an insulation defect, are permanently and reliably connected with the protective-conductor connection terminal of the power outlet. This solution takes place by way of the metal tab (6a) that projects out of the plug-in body (6) and is deflected at a 90-degree angle and thereby directed directly at the contact rail (7a) of the support insert (7). The metal tab (6a) is shielded with contact protection, as explained above with reference to FIG. 7, in that the shielding is guaranteed by way of the plastic crosspiece 4d, the plastic crosspieces 6b, and the plug insertion channel 9a.

An alternative embodiment of the plug-in body (6) is shown in FIG. 16. In this embodiment, two crosspieces (6f) are additionally provided on the outside. The crosspieces (6f) bring about elevation by approximately 3 mm, which increases the insulation strength of the surface, in other words the creep distance.

FIG. 12 shows the connection shoe (5) that produces the connection between contact rail (7a) and metal tab (6a) and thereby guarantees fault-current discharge.

FIG. 13 shows the cover ring (12) and the cover plate (11). The cover ring (12) closes the apparatus oft toward the outside, thereby guaranteeing that both the mounting box (1) and the installed connection system do not have any exposed and touchable surfaces. The cover ring has engagement journals (12a), which lie against the outsides of the engagement crosspieces (9d) of the support plate (9) and thereby form a reliable closure. Afterward, release of the cover ring (12) from the support plate (9) is only possible by means of a tool (screwdriver).

When a ceiling connector for light fixtures is not in use, the cover plats (11) can be inserted into a circumferential groove (12b) of the cover ring (12), so that in comparison with previous lighting outlets (light fixture connection points) having a chandelier terminal and hook, an esthetic look is achieved.

FIG. 14 shows the 3-pole chandelier plug (10) according to DIN-EN 61 995-1 with cable access (10b) and engagement (10c) to the plug insertion channel (9a), including the poles (10a).

FIG. 15, in an exploded representation, shows an apparatus for connection of electric wall light fixtures to a mounting box, in which a commercially available wall mounting box (15) was attached in the wall by means of the spreader brackets (1d). Cable ends (15c) pass out of the wall box through the broken-out perforation openings (1f). The stripped cable ends (15c) are connected with the plug-in body (6), which is pushed into the engagement insertion openings (15a) of the insertion channel with the engagement projections (15b), and is thereby firmly connected. In this way, it is guaranteed that the entire system, consisting of wall box lid (15d) with insertion channel (15e), including the set-on plug-in body (6), can be installed flush with the wall, toy means of the screws (15f) in the screw columns (15g). The screw columns (15g) are shortened by 2 mm, so that the wall box lid (15d) is laid in flush with the wall. The metal tab (6a) connected with the plug-in body (6) and the plastic crosspieces (6b) are pushed into a guide channel (15h) for reasons of contact protection, which channel is firmly connected with the wall box lid, is open on the underside, and lies laterally against the insertion channel (15e).

In FIG. 20, a reinforcement for improving stability during installation of the apparatus according to the invention, particularly in hollow walls or cavity ceilings, is shown. The reinforcement consists of a ring (16) that can be produced from, metal, plastic, wood, etc. The ring (16) is provided with a slot (16a). The inside diameter of the ring (16) essentially corresponds to the outside diameter of the mounting box (1) in the immediate vicinity of the cover ring (12). To affix the ring (16), it is positioned on the rear side of the wall or ceiling through the opening provided in the wall or ceiling. For installation, the mounting box (1) is introduced into the wall or ceiling through the opening. Because the ring (16) encloses the opening, the spreader brackets (1d) can support themselves on the ring (16), as shown in FIG. 21. The ring (16) increases the size of the support surface of the mounting box (1), so that the risk of the opening in the wall or ceiling being torn out, particularly when connecting heavy light fixtures or chandeliers, is significantly reduced.

The invention claimed is:

1. An apparatus for connection of electric light fixtures having a fault-current discharge, comprising
   a support socket;
   a carrier insert with a contact rail which produces a support connection with a hook that can be folded down;
   a plug-in body having an outside;
   a support plate comprising engagement crosspieces;
   a plug insertion channel for insertion of a plug, the support plate being fitted with the plug insertion channel;
   a cover ring comprising engagement journals lying against outsides of the engagement crosspieces to form a closure;
   a metal tab inserted in the plug-in body below the plug insertion channel and projecting outwards from the outside of the plug-in body at a 90-degree angle toward the contact rail; and
   plastic crosspieces;
   wherein the support socket and the carrier insert are covered by the support plate, and the plug-in body engages by a catch below the plug insertion channel and the plug insertion channel is connected via a sliding or rigid connection or via a connection shoe to the metal tab via the contact rail;
   wherein the plastic crosspieces form a rear wall on the support socket and the plug insertion channel resting against a guide channel, and form a screened space in which the contact rail and the metal tab meet via the sliding or rigid connection or via the connection shoe and ensure a safe and reliable flow of current; and
   wherein the plug is a light fixture plug and can be plugged in through the insertion channel into the plug-in body.

2. The apparatus according to claim 1, wherein the metal tab is rigid, is a spring, or is a connection shoe.

3. The apparatus according to claim 1, wherein the insertion channel is firmly connected with the support plate.

4. The apparatus according to claim 1, wherein the insertion channel is connected with the support plate in a firm or set-on manner, and engagement insertion openings accommodate the plug-in body by way of connection journals.

5. The apparatus according to claim 3, wherein the plug-in body is provided, on two sides, with engagement apparatuses that allow snap engagement on a socket adapter and on the insertion channel.

6. The apparatus according to claim 1, wherein the system forms a unit, with a wall box lid of a wall installation box, connected with box screws, and allows installation of wall light fixtures, flush with the wall.

\* \* \* \* \*